(12) United States Patent
Maliszewski et al.

(10) Patent No.: US 6,532,700 B1
(45) Date of Patent: Mar. 18, 2003

(54) FLANGE WITH CUT FOR WIND TOWER (75) Inventors: Leonard P. Maliszewski, Shreveport, LA (US); Patrick C. Lashley, Shreveport, LA (US)

(73) Assignee: Beaird Industries, Inc., Shreveport, LA (US)

( * ) Notice: Subject to any disclaimer, the term of this patent is extended or adjusted under 35 U.S.C. 154(b) by 8 days.

(21) Appl. No.: 09/716,122

(22) Filed: Nov. 9, 2000

(51) Int. Cl.⁷ .............................................. E04H 12/00
(52) U.S. Cl. .................. 52/40; 52/726.4; 174/45 R; 290/44; 343/875
(58) Field of Search .................. 52/726.4, 726.3, 52/736.1, 40, 245, 296, 187; 416/DIG. 6, 9; 290/44, 45; 343/874, 875; 174/45 R; 403/336, 337

(56) References Cited

U.S. PATENT DOCUMENTS

| | | | | |
|---|---|---|---|---|
| 1,262,966 A | * | 5/1918 | Schafly | |
| 3,768,016 A | * | 10/1973 | Townsend et al. | |
| 3,793,794 A | * | 2/1974 | Archer et al. | |
| 4,272,929 A | | 6/1981 | Hanson | |
| 4,935,639 A | | 6/1990 | Yeh | |
| 5,333,436 A | * | 8/1994 | Noble | |
| 5,687,537 A | * | 11/1997 | Noble | |
| 6,191,355 B1 | * | 2/2001 | Edelstein | |
| 6,335,709 B1 | * | 1/2002 | Cummings | |

* cited by examiner

Primary Examiner—Robert Canfield
(74) Attorney, Agent, or Firm—Wendy Buskop; Buskop Law Group, P.C.

(57) ABSTRACT

A flange for making a tower for a wind generator made up of a plurality of cylindrical segments, at least one conical transition rings, a plurality of L-shaped flanges having L cuts and a T-shaped flange.

21 Claims, 6 Drawing Sheets

FLANGE WITH CUT FOR WIND TOWER

BACKGROUND OF THE INVENTION

A great deal of interest is presently being shown in the development of alternative energy sources. One type of energy in which people are showing interest in is that from the wind. New and more efficient wind turbine generators are being developed, but these need to be placed on towers which are easy and economical to erect.

Large towers, forty or more feet tall, are needed to support wind turbines in that the generators are heavy and the towers also need to withstand strong lateral forces caused by the wind. These towers have in the past required guy wires, large base areas, and are generally not very aesthetic. Other towers have been created which are segments of frustro-conical sections welded together, which requires a lot of talent in the field to weld, hence making them expensive to acquire and build. Power towers have been described in recent patents such as U.S. Pat. No. 4,935,639 for a revolving power tower, and U.S. Pat. No. 4,272,929, both of which are incorporated by reference.

BRIEF SUMMARY OF THE INVENTION

This invention relates to a unique wind turbine tower having a unique L-shaped flange with an L cut. The unique tower comprises (1) a T-shaped flange; (2) a bottom section having a first end and a second end, with the first end being welded to the T-shaped flange, and wherein the first end with said T-shaped flange is anchored to a cement foundation; (3) a first transition ring having a first edge and a second edge, wherein the first edge is welded to the second end, and the second edge is welded to a L-shaped flange; (4) an upper section comprising a first upper end and a second upper end; (5) a L-shaped flange welded to the first upper end; (6) a conical transition ring having a first conical edge and a second conical edge, wherein the first conical edge is welded to said second upper end, and the second conical edge is welded a third L-shaped flange and bolts for securing the first L-shaped flange to the second L-shaped flange.

DETAILED DESCRIPTION

The present invention relates to a unique wind tower construction which utilizes a stringent and detailed certifying body that specialized in wind towers.

The present invention relates to a flange design for a wind tower which is tuned to the frequency of the wind turbine generator which is to be placed on the top of the tower.

The wind tower with novel flange is preferably constructed using an optimization program which determines the minimum plate thickness needed and structural components required to preclude vibration and harmonic build up in the tower created by the wind generator, while insuring strength in the wind tower.

The method for building this tower utilizes an optimization program to determine the exact thickness for each individual plate used in the tower construction in order to both achieve minimum steel thickness, thereby reducing materials cost, the cost of transporting the tower, and the cost in man hours to cut the metal used in the tower, while maintaining structural integrity and overall strength in the tower. Each tower is designed to various earthquake and wind parameters dictated by specialty certification-governing bodies.

For each tower, the novel method of construction includes as a step, an independent review and approval of the engineered characteristics of the tower by a specialty certification-body. In one embodiment, the tower and marine certification body of Germanischer Lloyd can be used. In another embodiment, the certification body, Det Norske Veritas of Denmark, could be used.

Figure 1:
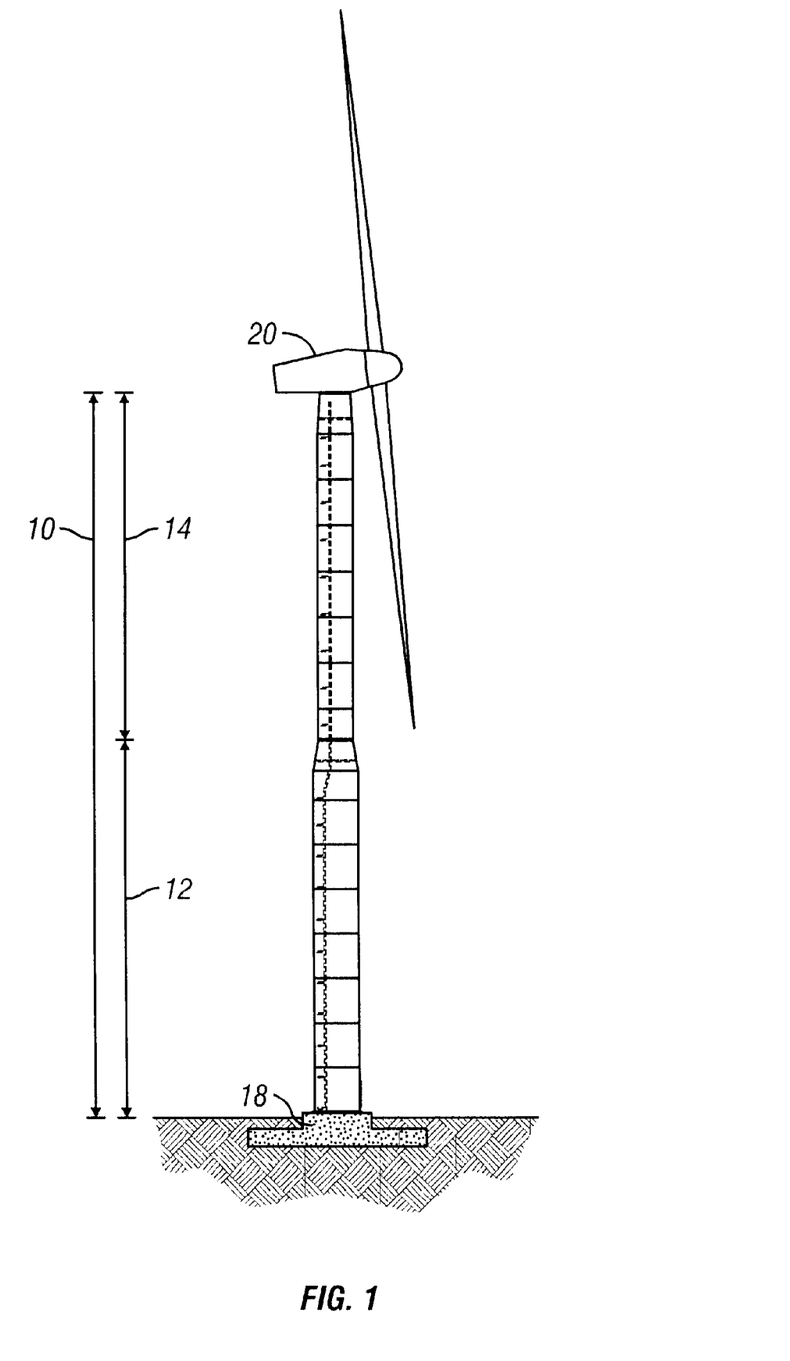
FIG. 1 is a side view of an erected tower embodying the invention with a wind turbine placed on it.

Referring now in detail to the figures, FIG. 1 shows one embodiment of the present invention, a fifty-meter tower constructed with the novel flange with L cut. The towers of this invention can range in height from 32 to over 80 meters.

For a 50-meter wind tower 10, two tubular sections, preferably cylindrical hollow sections are used, specifically, a bottom section 12 and an upper section 14. The bottom section 12 is connected to a T-shaped flange 16, which is bolted to studs embedded in concrete foundation 18. The cement 18 may be used with threaded rods or other materials to anchor and hold the resulting wind tower erect against the overturning movement caused by the turbine mounted to the top and when the wind touches in excess of 100 mph. The wind tower 10 is designed to support a wind turbine generator 20. Any of a variety of generators can be used, including, but not limited to, pivoting, stationary, low horsepower, and high capacity turbines. The bottom and upper sections are preferably made from steel, such as cold rolled steel, but other strong metals can be used as well, such as aluminum or metal alloys Preferably, the bottom section 12 and upper section 14 are constructed from a plurality of rings, each ring having the same outer diameter as the others rings in a section and are used to make that particular section.

Figure 2:
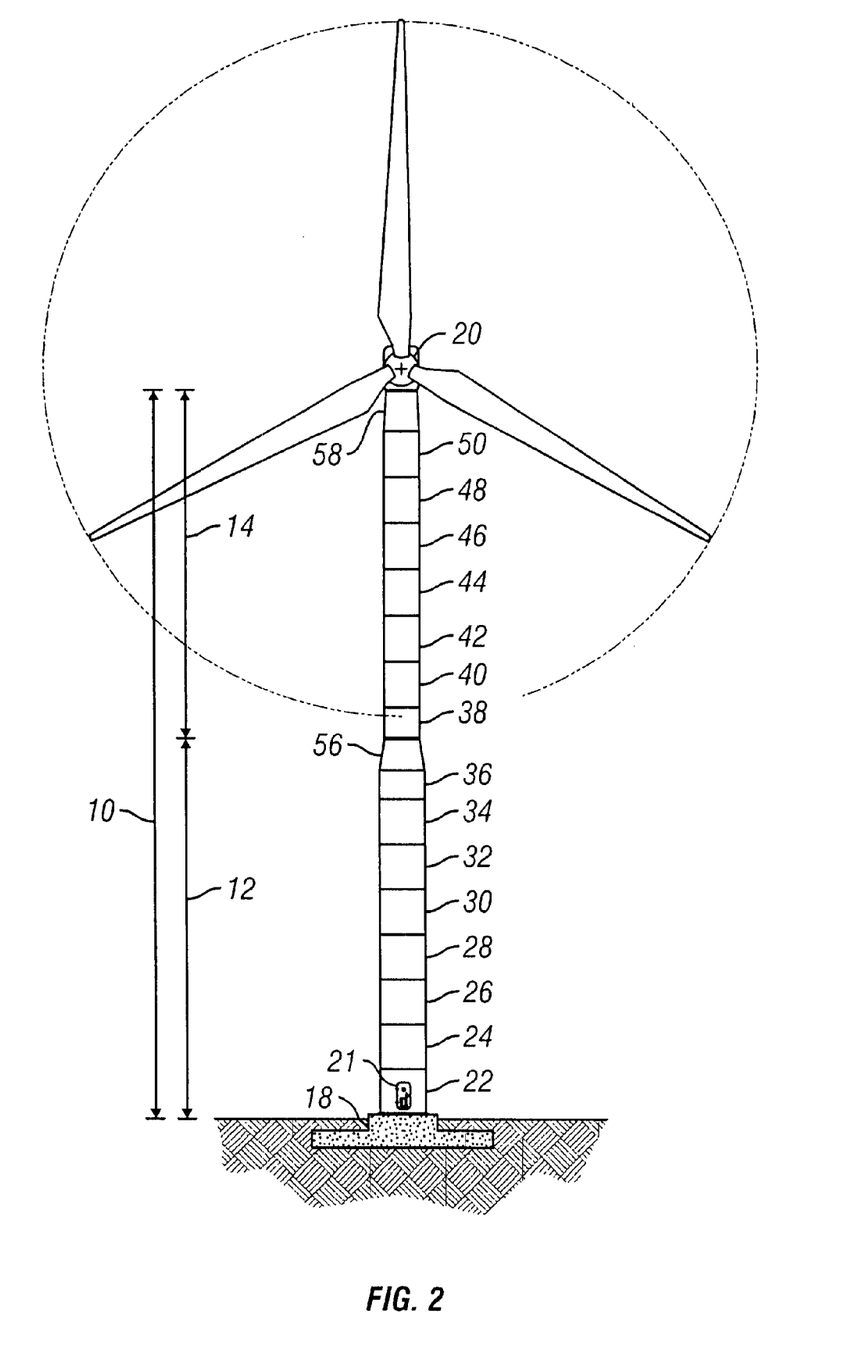
FIG. 2 is a front view of an erected wind tower with a wind turbine placed on the upper section.

In FIG. 2, the bottom section 12 includes first bottom ring 22 which is welded to second bottom ring 24. Third bottom ring 26 is welded to both second bottom ring 24 and fourth bottom ring 28. The additional rings 30, 32, 34 and 36 are welded together in a like manner. Each ring in the bottom section 12 has the same outer diameter. Each ring, 38, 40, 42, 44, 46, 48, and 50 in the upper section 14 has the same identical outer diameter. However, the outer diameter of the rings of the bottom section 12 differs from the outer diameter of the rings in the upper section 14. The outer diameters of the rings of section 12 can be up to approximately fifty (50%) wider than the outer diameter of the rings of section 14. If extremely heavy turbines are used, the outer diameter of section 12 can be 10 to 50%, preferably 15 to 25% larger than upper section 14.

The rings for the bottom section and for the upper section shown in both FIGS. 1 and 2 are pre-welded at the factory site. It is within the scope of the invention to weld the rings at the tower site.

The overall size of the subsequently created upper and bottom sections are selected so that the sections can be transported from the factory to the tower erection site in the most economical manner and with the least amount of road permits. It is contemplated that a tractor-trailer or train could be successfully used as a transport device to move the sections.

For larger towers, such as those 60 to 80 meters in height, three sections are contemplated, a bottom section 12, an upper section 14 and a middle section (not shown). In towers over 80 meters in height, four sections are contemplated, a bottom section 12, an upper section 14, and two additional sections. The additional sections can be bolted together with flanges having the L-cut or using one or more conical transition rings with L-shaped flanges with L-cuts. For towers with more than two sections, it is possible to construct the tower without additional conical transition rings. If additional conical transition rings are used, then the conical transition rings could be welded onto the additional sections at the factory. If additional flanges are needed, it is contemplated that they would be welded to the sections at the factory as well.

Figure 3:
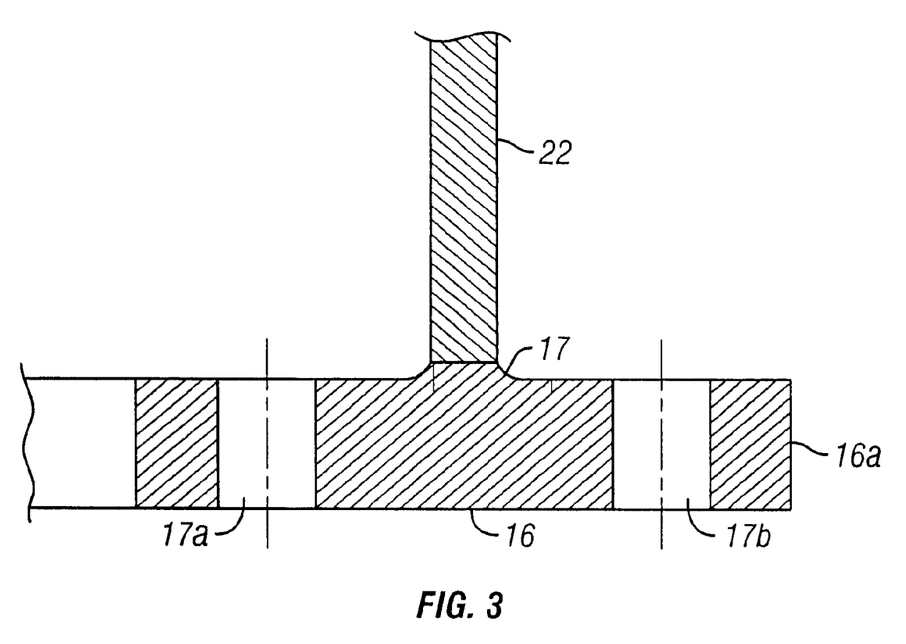
FIG. 3 shows the T-shaped flange which secures to the lowest part of a bottom section of a tower to a foundation.

In the preferred embodiment, a door 21, is installed in the bottom section 12, to permit access to the interior of the tower for painting, bolt tightening or wind turbine maintenance purposes. Bottom section 12 has a first transition ring welded to the top portion as shown in FIG. 2 which can be conical or cylindrical. FIG. 3 shows a welded T-shaped flange 16, of which stub 17 forms a part, located at the lower end of bottom section 12. Stub 17 aids in the alignment and welding of T-shaped flange 16 to ring 22. Bolt holes on inside and outside bolt circles in T-shaped flange 16 allows wind tower 10 to be secured to the anchor bolting of foundation 18.

Figure 4:
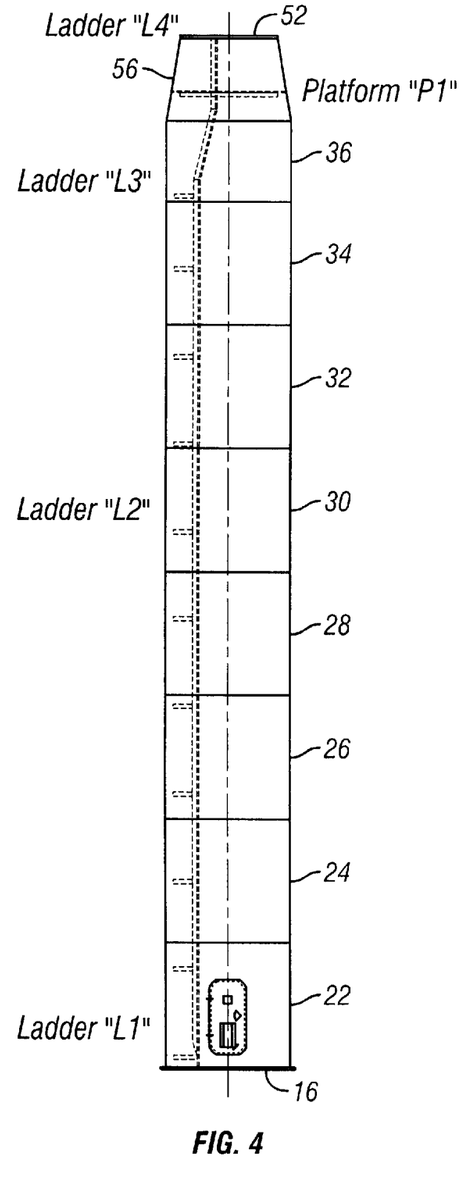
FIG. 4 shows the bottom section of a typical 50 meter, two section wind tower.

FIG. 4 shows the bottom section 12, with the plurality of welded rings 22 and 26 and the first transition ring 56, welded to the section.

Figure 5:
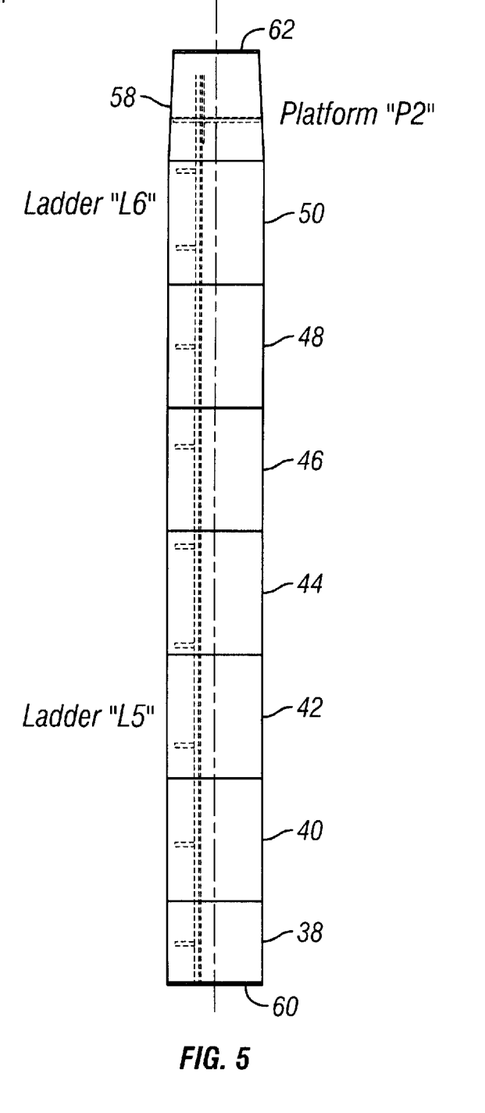
FIG. 5 shows the upper section of a typical 50 meter, two section wind tower.

FIG. 5 shows upper section 14 with a plurality of rings 38 to 50 having identical outer diameters. A second L-shaped flange 60 is welded to the bottom ring 38 of the upper section 14. On the top portion of upper section 14, is welded a second conical transition ring 58 is welded to cylindrical ring 50.

In a preferred embodiment, both conical transition rings 56 and 58 are reinforced by having thicker plates than the plate thickness used in the adjacent rings 48 and 34 in sections 12 and 14. In addition, L-shaped flanges 52 and 62, disposed on one side of the conical transition rings, give additional support for the stress load transfer from the wind turbine.

The first and second transition rings 56 and 58 are hollow frustro-conical segments. For taller towers additional conical transition rings of frustroconical shape may be used. The first transition ring 56 may have a slightly larger diameter than the conical transition ring 58. These rings are initially cut from flat plate, with a particular shape, designed for the particular wind tower height. The cut plate is then rolled, and the ends are welded together, typically using submerged arc welding. The conical transition rings can also be connected by welded to a second plate on the interior of the ring.

For a 50-meter tower, a preferred embodiment uses rings for the bottom section having an outer diameter of 118 inches, and in the upper section having an outer diameter of 90 and $15/16^{th}$ inches.

Figure 6:
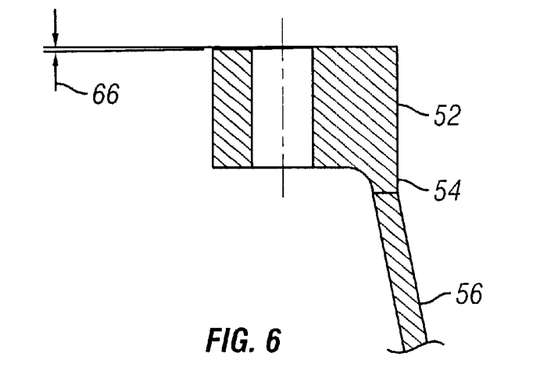
FIG. 6 is a cross sectional view of a first L-shaped flange which secures to the upper section 14 to the bottom section 12.
Figure 7:
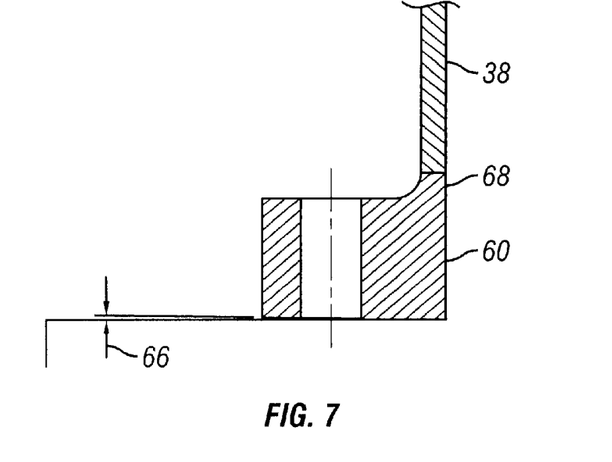
FIG. 7 is a detailed view of the second L-shaped flange, which secures to the bottom section 12 to the upper section.
Figure 8:
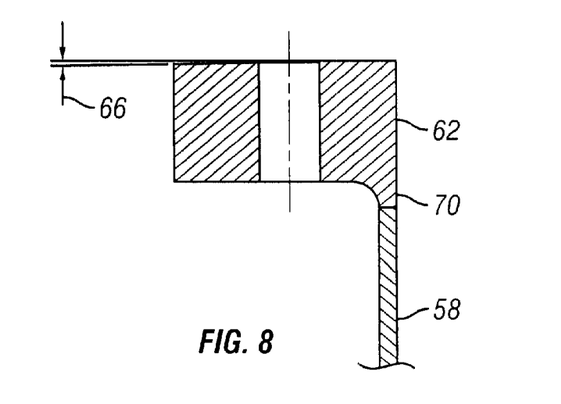
FIG. 8 is a cross sectional view of the third L-shaped flange, which secures to the upper part of the wind turbine generator 20.

A third L-shaped flange 62 is fitted to the top portion of the second conical transition ring 62. A detail of the first L-shaped flange is shown in FIG. 6 and a detail of the second L-shaped flange is shown in FIG. 7. The third L-shaped flange is shown in FIG. 8. Each L-shaped flange has a sloping side 66 to compensate for warpage during welding.

In FIG. 6, the L-shaped flange has a flange stub 54 and a sloped side 66. The transition ring 56 is welded to the stub 64. The sloped side is used so when the stub 64 is welded, the flange aligns with the ring.

In FIG. 7, the flange 60 is shown with the stub 68 welded to the bottom ring 38 of the top section 12 with the sloped side 66.

In FIG. 8, the third L-shaped flange 62 is shown with stub 70 welded to the top conical transition 58 with the sloped side 66. On the interior of the tower a ladder assembly is welded. The ladder is preferably made from of a polymer, PVC, fiberglass, plastic coated metal, laminate structure or combinations thereof as detailed in FIG. 9. The ladder is spaced from the sides of the tower using supporting brackets, which enable maintenance people to use the interior of the tower and repair the wind turbine without the need for any additional safety equipment, such as a safety harness. The ladders are typically used and constructed so that the back of the maintenance person is in close contact with the interior wall of the tower so that climbing occurs more safely.

Returning to FIG. 1, it is preferred that a T-shaped concrete foundation 18 be poured into a hole dug in the ground. Other foundation configurations may be possible so long as the combined natural frequencies of the wind turbine generator 20, the wind tower 10, and the concrete foundation 18 meet acceptable frequency criteria. Rebar is included to strengthen the cement surrounding the tower. Studs (not shown) extend from the concrete pad 18 enabling the T-shaped flange 16 welded to the bottom section 12 to be attached, such as with bolts at another conventional means.

The concrete foundation 18 can be used to not only give additional stability to the tower, but also to assist in dampening the natural frequency vibrations caused by the wind to the tower.

Figure 9:
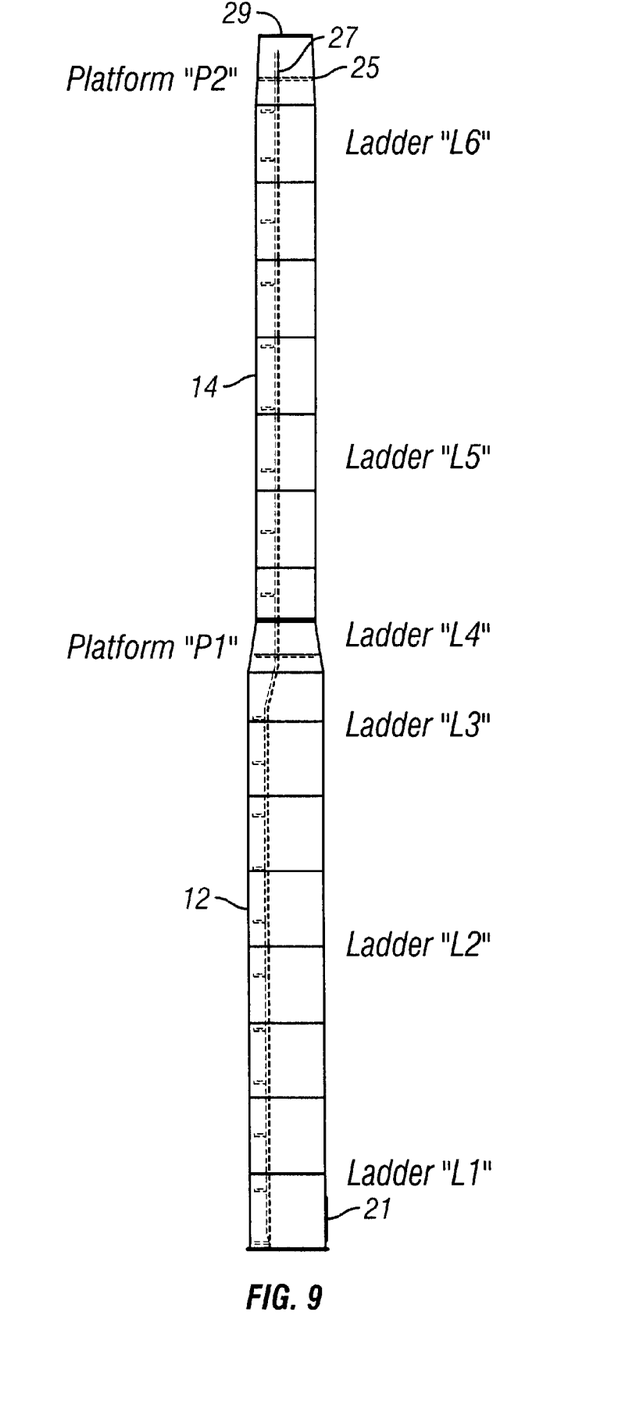
FIG. 9 is an exaggerated detailed view of the bottom section of one embodiment of the wind tower.

At the top of the tower 10, there is provided a platform from which a wind turbine generator housing is installed on L-shaped flange 62 of the top section 14. Pivot pins and conventional mounting means are used to allow the wind generator 20 to face the wind direction. These mounting assemblies can typically be bolted to a platform secured to the top of the tower. Additionally, a middle platform can be installed at a midpoint or other point in the tower from which maintenance work can be done. FIG. 9 shows one embodiment of the bottom section 12 of the wind tower 10.

The tower of this invention can be assembled in such a manner to allow only minimal personnel to erect the tower with no specialized welding required. The first step in such a procedure is to dig a foundation site in the ground. It is assumed that the soil around the hole is compact, undisturbed soil, although an engineer prior to construction should generally verify soil conditions. In compact, undisturbed soil it is found that the best shape of the hole would be relatively narrow and deep, allowing the amount of cement used to be kept to a minimum.

In the hole, a concrete foundation 18 is formed and studs are cast into the foundation. Concrete is then poured. The bottom section 12 is then placed over the studs and the T-shaped flange 16 is bolted to the studs. The first transition ring is welded to the top of the bottom section 12 on the end opposite the T-shaped flange 16 at the factory, along with a first L-shaped flange 52 which is welded to the first transition ring 56 on the end opposite the T-shaped flange 16 of the bottom section 12.

Once the bottom section 12 is in place, the upper section 14 is raised until it reaches the top of the first transition ring 56 which can be conical or cylindrical. The upper section 14 consists of a second L-shaped flange 60 welded to the bottom portion of the upper section 14 at the factory in the preferred embodiment. The second L-shaped flange 60 is then bolted to the first L-shaped flange 52 in the field. The L-shaped flanges have additional L-shaped cuts which enable the flange to flex and little pressure is needed on the bolt. No additional field welding is necessary to secure the bottom section to the upper section. At the factory, a conical transition ring 58 is welded to the edge of the upper section which is opposite the edge of the second L-shaped flange 60. The conical transition ring 58 is welded to, and on the side opposite the upper section 14 a third L-shaped flange is welded, and on a tall tower may optionally be cylindrical. To this third L-shaped flange 62 is bolted the housing for the wind turbine 20.

FIG. 9 shows the interior of the wind tower 10, one or more platforms can be affixed. One platform is bolted to studs on the top of the tower. The studs are welded to the interior of the tower at the factory prior to shipping the tower to the field. In the most preferred embodiment, the tower is shipped with the ladder and the platforms installed, so that there is minimal field assembly work.

To insure that there is no destruction of the wind turbine generator, the tower supporting the generator must be sufficiently strong to withstand winds in excess of 100 miles per hour. Some designs may require conditions with winds of 160 mph.

It should be noted that the tower could be varied after the initial machine is placed on it. For example, the user of the tower wishes to support a heavier load or perhaps a different machine requiring a different connection, all that need be done is to reverse the steps of assembly, lowering the machine and the various sections starting at the top until the section which is desired to be replaced is removed. For a different type of machine, all that may be required is removing the uppermost section and replacing it with a similar section having a different means for attaching the new machine to the tower. For a heavier machine, replacement may require changing the structure of the sections to strengthen them and may even require sawing off a portion of the lower section and re-drilling holes for the set screws so to vary the characteristics of that section.

In the preferred embodiment, the door is a water-resistant door, such as a door with an on capsulated gasket which can be locked.

The invention contemplates using cylindrical sections. As a specific example, for a 50-meter tower, the bottom section could have seven rings, preferably each of the exact same outer diameter and eight rings for the upper section, each of the eight rings having the exact same outer diameter.

The conical rings for the 50-meter tower can have a slope of up to 10 degrees.

The tower may include one coat of 20-year life paint to prevent corrosion. It may have optional equipment, such as two grounding lugs for grounding of lightening.

The tower may have a control box for the wind generator turbine located on the interior, on the cement of the tower, supporting the power and signal cables from the turbine.

As another example, for an 80-meter tower, 4 sections may be used with 3 conical transition rings. In the bottom section, 6 rings could be used, 6 rings could be in the second section, 6 rings could be used in the third section and 6 rings in the upper section. The diameter of the bottom section may equal or be larger than the second section, which may be larger than the third section, which may be larger than the upper section.

What is claimed is:

1. A tower for supporting a wind turbine generator comprising:
    a T-shaped flange;
    a bottom section having a first end and a second end, said first end being welded to said T-shaped flange, and wherein said first end with said T-shaped flange is anchored to a cement foundation;
    a first transition ring having a first edge and a second edge, said first edge welded to said second end, and said second edge welded to a first L-shaped flange having a first stub;
    an upper section comprising a first upper end and a second upper end;
    a second L-shaped flange having a second stub welded to said first upper end;
    a conical transition ring having a first conical edge and a second conical edge, said first conical edge welded to said second upper end, and said second conical edge welded to a third L-shaped flange; and
    bolt means for securing said first L-shaped flange to said second L-shaped flange.

2. The tower of claim 1, wherein said first, second and third L-shaped flanges have a sloping side to compensate for warpage due to welding.

3. The tower of claim 1, wherein said flanges comprise stub ends to facilitate welding of said bottom section and said upper section.

4. The tower of claim 1, wherein the bottom section and the upper section are hollow and cylindrical.

5. The tower of claim 1, further comprising a door located in the base of a lower section.

6. The tower of claim 1, wherein T-shaped flange is angled 2 to 10 degrees from the horizontal plan of the base of said tower.

7. The tower of claim 5, wherein said door is a marine, water resistant door with encapsulated gasket.

8. The tower of claim 1, wherein the bottom section has a outer diameter up to 30% larger than the outer diameter of the upper section.

9. The tower of claim 1, further comprising a ladder mounted on the interior of said tower.

10. The tower of claim 1, wherein said bottom section and said upper section have identical geometric shapes having from 1 to 12 sides.

11. The tower of claim 1, wherein the bottom section and upper section and transition rings consist of metal plates which are optimized to minimize destructive structural vibration and minimize construction costs.

12. The tower of claim 1, having an overall height of 50 meters, wherein said 50 meter tower has a bottom section comprising 7 rings of a first outer diameter and an upper section comprising 8 rings of a second outer diameter, wherein the first outer diameter is up to 30% larger than the second outer diameter, and two conical transition rings.

13. The tower of claim 12, wherein the rings are cylindrical.

14. The tower of claim 1, which is the slope of the conical transition ring is up to 10 degrees.

15. The tower of claim 1, further comprising a one-coat 20-year life paint.

16. The tower of claim 1, further comprising two grounding lugs for grounding of lightening.

17. The tower of claim 1, further comprising supports for power and signal cables from the wind generator turbine to a control box mounted on the cement of said tower.

18. The tower of claim 1, further comprising a plurality of platforms mounted on studs welded to interior walls of said tower.

19. The tower of claim 1, wherein said tower is 80 meters in height, further comprising three conical transition rings, with six rings in the bottom section, six rings in a middle section, six rings in a third section and six rings in said upper section, wherein the outer diameter of said bottom section is larger than the outer diameter of said middle section, and wherein outer diameter of said middle section is larger than the outer diameter of said third section and wherein said outer diameter of said third section is larger than the outer diameter of said upper section.

20. The tower of claim 19, wherein said rings in the bottom section, upper second, middle section and third section are cylindrical.

21. The tower of claim 1, wherein said transition ring has a frustro-conical shape.

\* \* \* \* \*